United States Patent [19]

Migler

[11] Patent Number: 4,643,682

[45] Date of Patent: Feb. 17, 1987

[54] TEACHING MACHINE

[76] Inventor: Bernard Migler, 1405 Autumn La., Cherry Hill, N.J. 08003

[21] Appl. No.: 732,938

[22] Filed: May 13, 1985

[51] Int. Cl.$^4$ .............................................. G09B 7/06
[52] U.S. Cl. .................................... 434/321; 434/335
[58] Field of Search ..................... 434/321, 307, 335

[56] References Cited

U.S. PATENT DOCUMENTS

| | | | |
|---|---|---|---|
| 4,230,256 | 3/1982 | Freeman | 434/321 |
| 4,464,124 | 8/1984 | Romero et al. | 434/321 |
| 4,468,204 | 8/1984 | Scott et al. | 434/321 |
| 4,482,328 | 11/1984 | Ferguson et al. | 434/335 |
| 4,539,435 | 9/1985 | Eckmann | 434/321 |

*Primary Examiner*—Leo P. Picard
*Attorney, Agent, or Firm*—Norman E. Lehrer

[57] ABSTRACT

A system comprised of a personal computer controlling a tape recorder and connected to a telephone line providing the capability to deliver programmed instruction over the telephone. The caller listens to instructions and then questions from the tape. He speaks his response after the tape has stopped and then hears the correct answer played from the tape. If the caller's response was correct, he dials a 1 on his telephone and dials a 0 if his answer was incorrect. The next question and answer are then played. If his previous answer was incorrect, then after the next question and answer sequence, the tape is rewound to the question that was answered incorrectly and the same is replayed. The computer may be programmed to return to questions previously answered incorrectly any number of times during the lesson. The system is particularly suited for instruction in foreign languages but other subject matter may also be taught.

5 Claims, 10 Drawing Figures

TEACHING MACHINE

BACKGROUND OF THE INVENTION

The present invention is directed toward a teaching machine and more particularly toward a teaching machine which incorporates the use of the telephone line to deliver tape recorded instructions, questions and answers. The machine also receives the student's spoke responses and receives indications from the student as to the correctness or incorrectness of his response which is indicated by the student by dialing a number on the phone. Instruction in foreign language is particularly appropriate for the system of the invention but other subject matter can also be taught.

The prior art includes teaching machines in which instructions or questions from a tape recorder or the like are presented to the student who then responds usually by operating a keyboard or similar device on the machine. However, in only one case known to applicant has the use of a telephone-mediated teaching device been disclosed.

U.S. Pat. No. 4,320,256 to Freeman discloses a teaching machine in which a tape recorder is used to present instructions or multiple choice questions to the student. The student responds by dialing a digit on his telephone corresponding to his selected answer and the choice made determines the next track of the tape to be played. For example, if a 2 is dialed, the next track played is track 2. The tape always proceeds in the forward direction, playing one of the several tracks and apparently without stopping at the end of a question.

There are several disadvantages of the Freeman teaching machine system. First, the response that is called for is always a multiple choice response. Particularly when teaching a foreign language, the desired response should be spoken by the student and a multiple choice response system is clearly undesirable.

Freeman also makes no provision for the automatic return to and replaying of questions which the student answered incorrectly. For the purpose of instruction in a foreign language, a second delayed opportunity to translate a sentence from one language to another, after an initial error is made and after being presented with the correct translation, is highly desirable and is not available with the Freeman system.

Even further, the Freeman patent appears to require the use of an unconventional tape recorder with four or more playback heads. Thus, special equipment is required which would greatly increase the cost thereof over conventional stereo tape recorders with two playback heads.

SUMMARY OF THE INVENTION

The present invention is believed to overcome the deficiencies of the prior art discussed above. The invention is comprised of a stereo tape recorder controlled by a microcomputer, both of which are connected to a telephone line. The telephone line is also connected to a telephone ring detector and touch tone decoder. The system provides the facility for a person to obtain programmed instruction from the tape recorder over the telephone.

The tape recordings have the instructional material, i.e. instructions, questions and answers, on one track of the tape and control signals on the other track. These control signals are continuous tones that are present during the teaching or the question or answer with a period of silence between the control signals. The computer can then operate the solenoid controlled tape recorder and fast forward or rewind the tape while counting tones to search for and play any segment of the tape.

When in operation as a teaching machine, the student listens to a segment of tape containing a question (or some instruction followed by a question) and the tape then stops as a result of the computer detecting the end of a control signal. A signal is then given for the student to speak his answer. For example, a voice synthesizer may say "speak" or a simple tone or beep may be used. The telephone line is then connected to the computer's cassette input port and the computer waits for audio input (the spoken answer of the student) to begin and end.

The end of a response is defined to be a pause of 0.5 seconds. When this occurs, the computer causes the tape player to play the next segment of the tape containing the answer or correct response into the telephone line. The tape machine then stops as a result of the detection of the end of the control signal and a synthesized voice instructs the student to dial a 1 if his answer was correct or a 0 if his answer was incorrect.

If the student's answer was correct as indicated by a dialed 1, the computer causes the next question and answer sequence to be played. If, on the other hand, a 0 was dialed, a computer stores that fact, causes the next question and answer to be played and then returns to the question that had been answered incorrectly. It returns by rewinding the tape until it finds the appropriate control signal, stops and repeats the question and answer as before. Subsequently, it fast forwards to the point from which it rewound to continue the instruction where it left off. The tape will rewind and fast forward any number of times to and from any location, as needed.

BRIEF DESCRIPTION OF THE DRAWINGS

For the purpose of illustrating the invention, there is shown in the accompanying drawings one form which is presently preferred; it being understood that the invention is not intended to be limited to the precise arrangements and instrumentalities shown.

DETAILED DESCRIPTION OF THE PREFERRED EMBODIMENT

Figure 1:
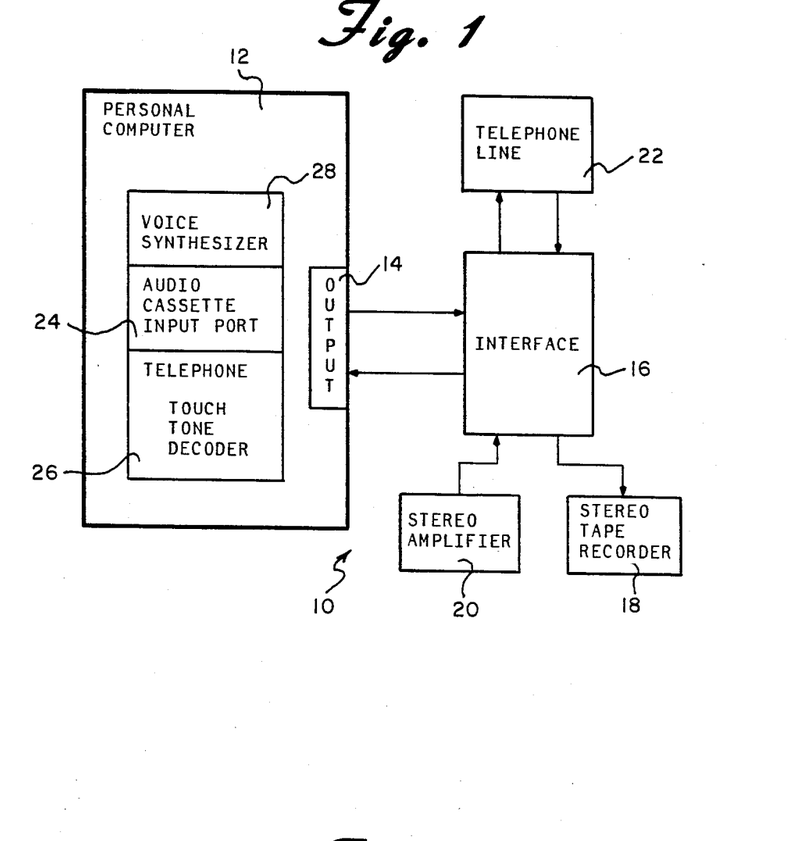
FIG. 1 is a schematic representation in functional block diagrammatic form or a telephone-mediated teaching machine constructed in accordance with the principles of the present invention.

Referring now to the drawings in detail wherein like reference numerals have been used throughout the various figures to designate like elements, there is shown in FIG. 1 a block diagram of a telephone-mediated teaching machine constructed in accordance with the principles of the present invention and designated generally as 10. The teaching machine 10 includes a conventional personal computer 12 having its output port 14 connected to interface 16 for controlling the various other components of the system. More specifically, the computer 12 through interface 16 controls the operation of the stereo tape recorder 18 and the flow of questions and answers from the amplifier 20 to the telephone line 22. The computer 12 through the interface 16 also controls the flow of control signals from the amplifier 20 to the computer, the flow of vocal responses from the student over the telephone line 22 to the computer's cassette input port 24, the touch tone (rotary dial) signals from the student over the telephone line 22 of the touch tone decoder 26 associated with the computer 12 and the synthesized voice from the voice synthesizer 2 (or other signal) to the student informing him when to speak and when to dial.

Figure 2:
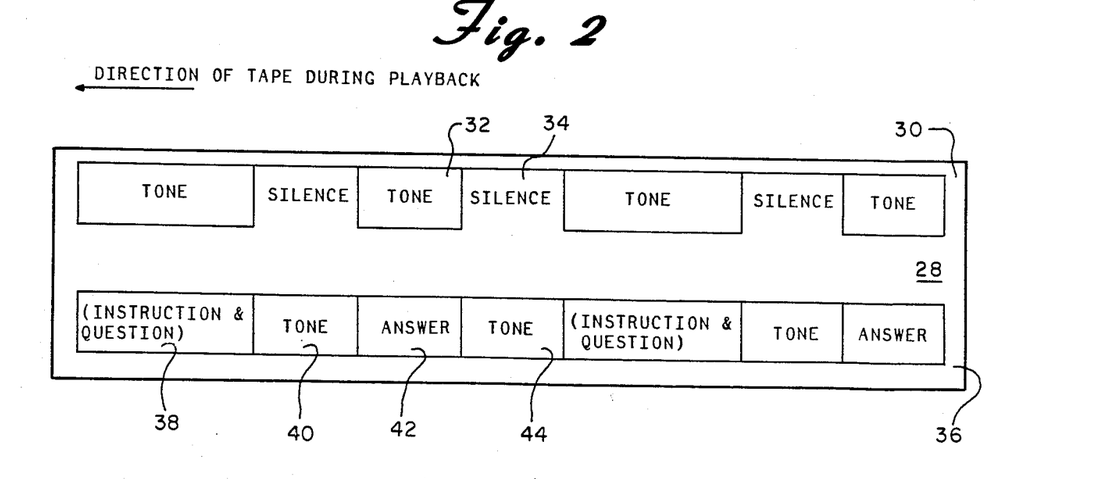
FIG. 2 is a diagrammatic representation of a typical section of recording tape showing the placement of the various signals and information recorded thereon.

FIG. 2 illustrates, in diagrammatic form, a segment of a magnetic recording tape 28 used with the invention. The tape is a conventional magnetic tape which may be carried on reels or in a cartridge or a cassette depending on the type of stereo tape recorder 18 being utilized.

Only two tracks of the tape are utilized to carry the information which is prerecorded thereon. The first track 30 contains the control signals which are comprised of segments 32 of a continuous tone and segments 34 of silence which separate the tone segments 32. The second track 36 of the tape 28 is the question and answer track and is divided into four segments. These are the question segment 38 (or a teaching instruction followed by a question), a tone segment 40, an answer segment 42 and a tone segment 44. These four segments are repeated in the same sequence throughout the length of the tape.

It should be noted that the question segments 38 and answer segments 42 on track 36 are in substantially exact alignment with the continuous tone segments 32 of track 30. The segments of silence 34 on the control track 30 can, therefore, be used to locate the beginning and end of a question segment 38 or an answer segment 42. They can also be counted during rewinding and fast forwarding to locate any specific question or answer on the tape. The tones 40 and 44 are placed between the question segments 38 and the answer segments 42 so that there is never is period of complete silence on both tracks. This permits the use of the two types of tape recorders described below.

Figure 3:
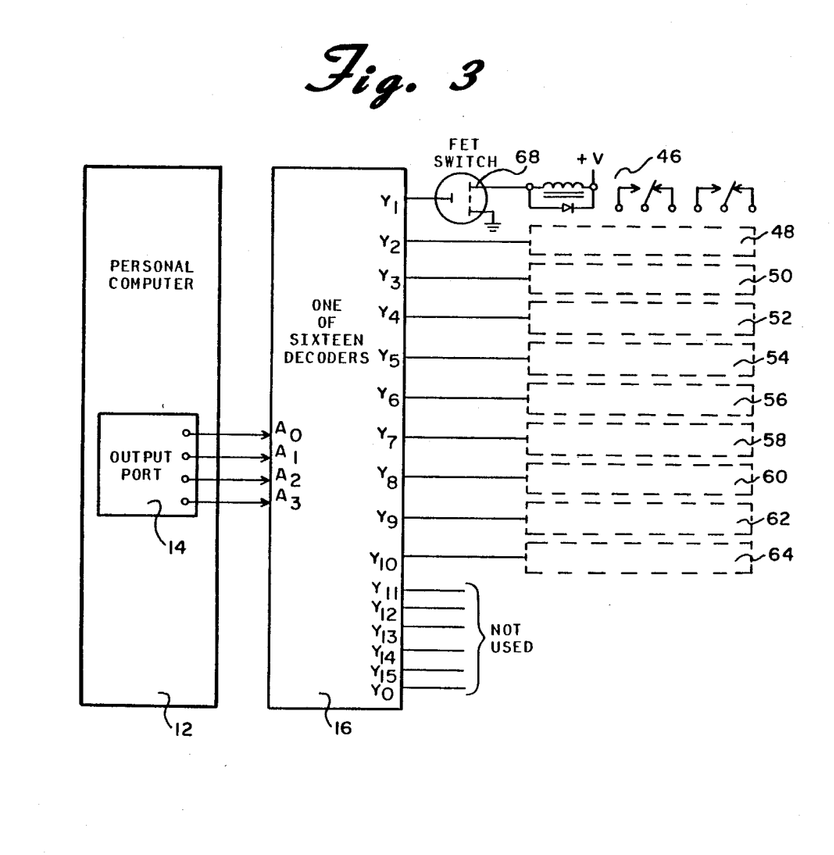
FIG. 3 is a schematic representation of a computer interface utilized with the present invention.

FIG. 3 illustrates the main portion of the interface 16. Ten electrically controlled switches are utilized with the invention. In the preferred embodiment thereof, the switches are double pole double throw relays such as shown at 46 in FIG. 3. The remaining nine relay switches 48, 50, 52, 54, 56, 58, 60, 62 and 64 are shown in block form only in FIG. 3. It is understood that these relay switches are similar to relay switch 46.

Four output lines are utilized from the output port 14 of the personal computer 12 and are connected to the input of the one of sixteen decoder 66. Only the first ten outputs of the one of sixteen decoder 66 are utilized and binary coded signals from the computer 12 are utilized to select the appropriate output of the one of sixteen decoder 66. Each of the outputs from the one of sixteen decoder 66 is intended to drive a different one of the relay switches 46-64. This is preferably accomplished by the use of ten field effect transistors located between the outputs and the relays. Only one such field effect transistor 68 is shown in FIG. 3 connected between the first output y1 of the one of sixteen decoder 16 and the relay switch 46. It is understood, however, that a similar field effect transistor is located between the remaining nine outputs (y2-y9) of the one of sixteen decoder 66 and a different one of the remaining relay switches 48-64.

It should be readily apparent to those skilled in the art that the field effect transistors may not be necessary in the event that the current drain from the relay switches 46 or other electrically operated switches does not exceed the limits of the one of sixteen decoder 66. In such a case, the outputs may be connected directly to the corresponding relay switches. Furthermore, if the computer 12 itself has ten or more output lines at the output port 14, the one of sixteen decoder may be omitted altogether and the output lines from the computer can be utilized to drive the relay switches directly or, if necessary, through the use of field effect transistors or other high current switching devices. The remaining elements of the interface 16 are the telephone coupler transformer 70, the line matching transformer 72 and the electrical interconnections between the various elements as shown in FIGS. 4 and 5.

Figure 4:
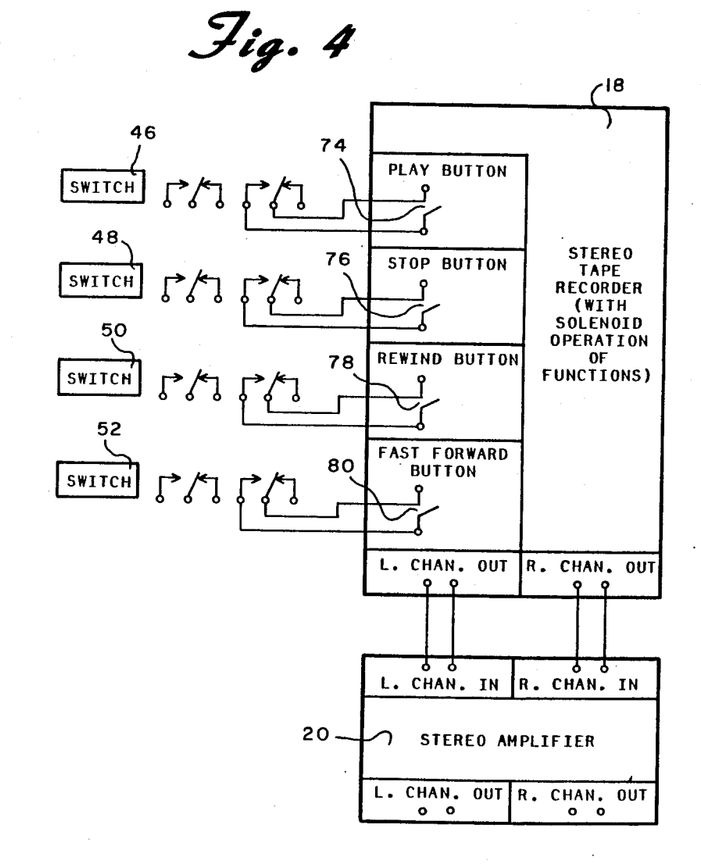
FIG. 4 is a schematic representation of the manner in which the solenoid-operated tape recorder is controlled.
Figure 5:
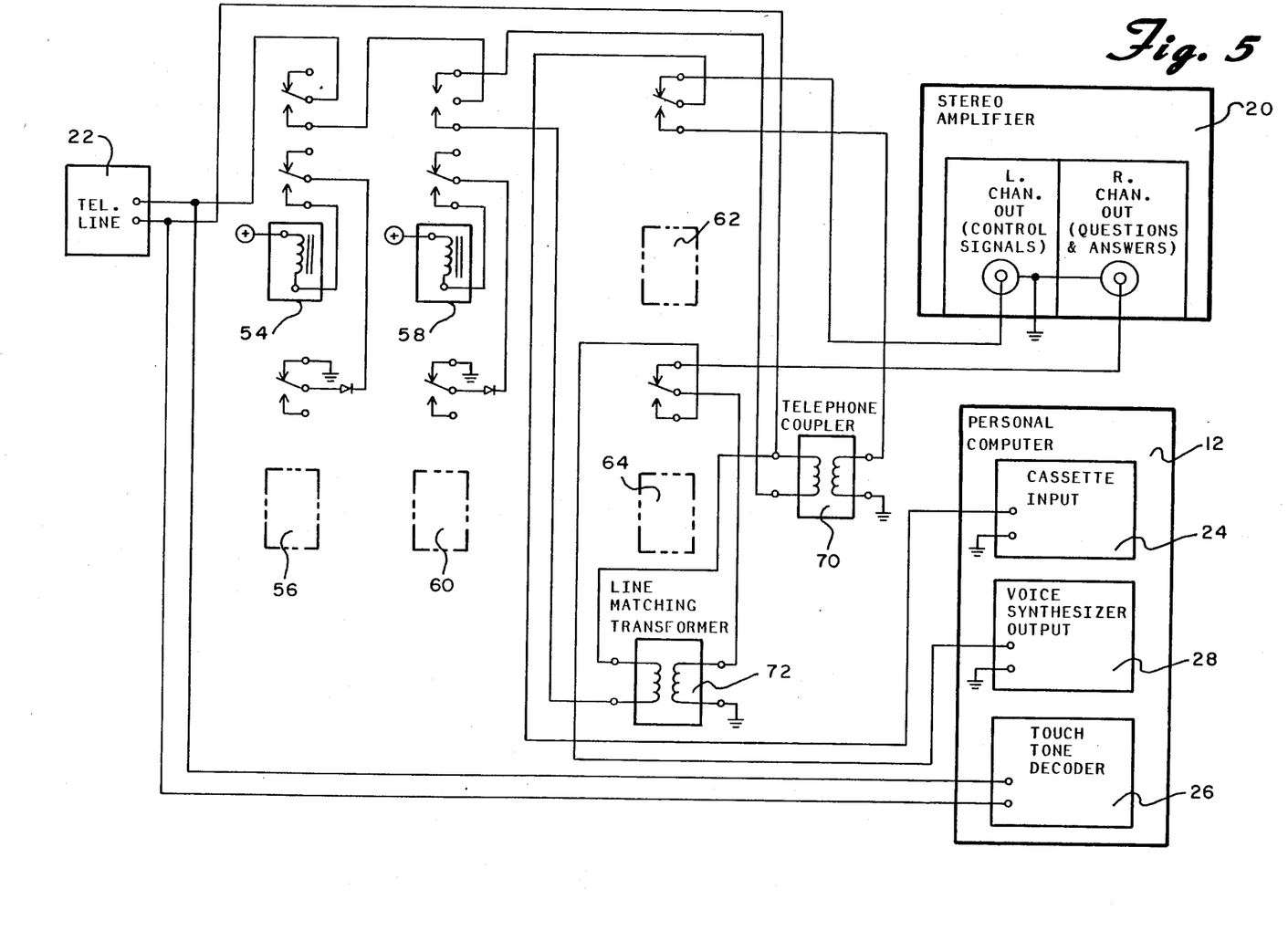
FIG. 5 is a schematic representation, partially in block form, illustrating a typical relay network allowing the computer to control the tape recorder and the signals to and from the telephone line.
Figure 6:
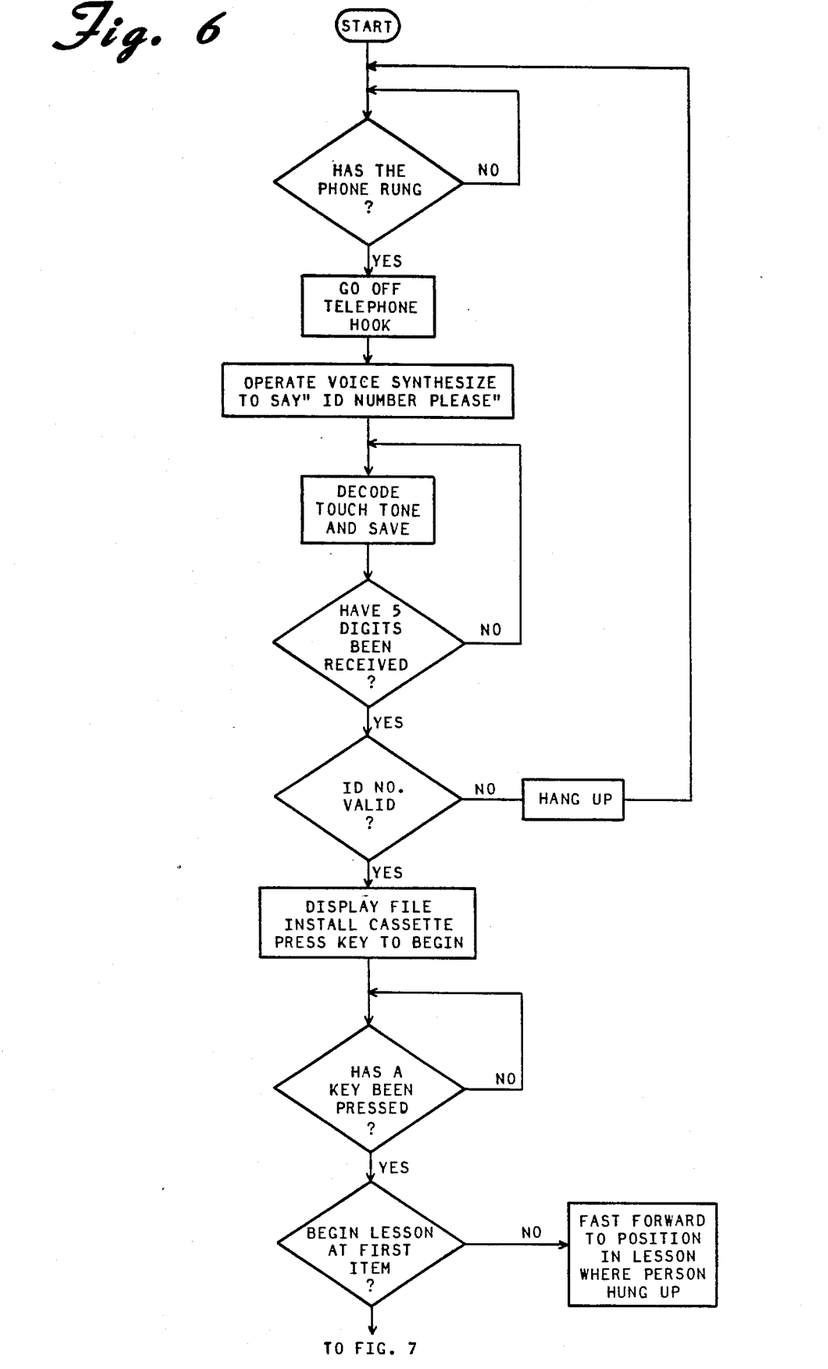
FIGS. 6-10 are, collectively, a flowchart illustrating the operation of the computer.

FIG. 4 is a schematic representation of the stereo tape recorder 18 and stereo amplifier 20 used with the invention. For the purpose of this system, only the playback and not the record function of the tape recorder 18 is utilized. Accordingly, a tape player without a record function could be used. The tape recorder 18 is of the type wherein the play, stop, rewind and fast forward functions are controlled by solenoids which are normally operated by the user depressing the play, stop, rewind and fast forward buttons on the machine, thereby closing switches 74, 76, 78 and 80, respectively. These four switches, however, are each wired in parallel with one of the relay switches 46, 48, 50 and 52 as shown so that the tape recorder 18 can be controlled by the computer 12 through the interface 16.

There are two types of stereo type recorders presently on the market which can be used with the present invention. In each case, the playback head remains in contact with the tape during rewinding and fast forwarding. In one type of tape recorder, the user can listen to the playback or fast forward and stop the recorder at any desired point. When this type of recorder is used, the output of the channel for the track 30 containing the control signals is amplified by amplifier 20 and is used as an input to the computer's cassette input port 24.

In the second type of tape recorder, the user hears no sound during fast forwarding or rewinding. The tape recorder itself includes a circuit which listens for a period of simultaneous silence on both tracks and then stops the rewinding or fast forwarding automatically. When this type of recorder is used, the output of the playback head for the track 30 containing the control signals is amplified by amplifiers 20 and is used as an input to the computer's cassette input port 24. For the purpose of illustration, the track 30 containing the control signals will play on the left channel and the question and answer track will play on the right channel.

FIG. 5 is a schematic representation, partially in block form, illustrating the manner in which the computer-controlled switching relays cause the various other components of the invention to function. The operation of the circuit shown in FIG. 5 is best described by the following explanation of the various operating functions. At all times it will be understood that the various switching relays are controlled by the computer 12 and that substantially all operations take place in a predetermined sequential order in accordance with a computer software program which is illustrated in the flowchart in FIGS. 6–10.

To Play a Question or an Answer:

Relay switch 46 is operated causing the tape recorder 18 to play. The computer 12 then waits for a period of silence 34 at the cassette input port 24 and then for a tone 32 from the control signal track 30. The beginning of a tone on track 30 after a segment of silence 34 indicates the start of a question segment 38 or an answer segment 42 on the second or question and answer track 36.

At this time, relay switch 54 is activated to connect the telephone line 22 to the relay switch 58. It should be noted that relay switch 54 is maintained in its activated condition since the normally open position of the relay switch 56 completes an energization circuit for the relay coil of the relay switch 54.

Relay switch 58 is also activated and is similarly maintained in its activated condition through the normally open position of relay switch 72. With relay switch 58 activated, the output of the stereo amplifier 20 is matched to the telephone line 22 through the line matching transformer 72. The question 38 or answer 42 from the question and answer track 36 (the right channel of the stereo amplifier) will then be played into the telephone line 22.

When the computer 12, through the cassette input 24, senses a silent segment 34 from the control track 30, relay switch 56 is activated to restore relay switch 54 to its normally open position thereby disconnecting the telephone line 22 from the tape recorder 18 so that the tone 40 or 44 is not heard. This also prevents noise from the rewinding or fast forwarding from being heard. At this point relay switch 48 is activated to stop the tape recorder.

To Instruct the Caller to Speak and to Input the Spoken Response:

When it is desired to instruct the caller to speak, relay switch 58 is activated and is held in its activated position as described above thereby connecting the terminal from relay switch 54 to the line matching transformer 72. Relay switch 64 is also activated and held in its activated position thereby connecting the other side of the line matching transformer 72 to the output of the voice synthesizer 28.

Relay switch 54 is also activated and is held in its activated position thereby connecting the telephone line 22 to relay switch 58 and to the line matching transformer 72. At this point the computer 12 commands the voice synthesizer 28 to output the word "speak."

Immediately thereafter, relay switch 60 is activated to return relay switch 58 to its normal position thereby connecting the switch 58 to the telephone coupler transformer 70. Relay switch 62 is activated and held in that condition thereby connecting the telephone coupler transformer 70 to the cassette input port 24 of the computer 12. The computer then listens for a sound at the cassette input port 24 which is the student's spoken response. Upon detecting a silence of 0.5 second duration after the spoken response, the computer assumes that the student has finished his response and proceeds to the next operation.

To Instruct the Caller to Dial and to Input the Dialed Number:

Relay switch 71 is again activated and held in its activated position thereby again connecting the telephone line 22 to the line matching transformer 72. Relay switch 64 is also again activated to again connect the line matching transformer 72 to the output of the voice synthesizer 28 to command the voice synthesizer to output the words "Dial a 1 if yor response was correct. Dial a 0 if your response was incorrect."

If a touch tone telephone is being used by the student, the dialed response will be decoded by the touch tone decoder 26. If a rotary dial telephone is being utilized, the clicks from the rotary dial can be directed to the cassette input port 24 of the computer 12 so that the computer can count the clicks.

To Rewind:

In order to rewind the tape 28, the computer 12 causes relay switch 52 to activate thereby operating the rewind function of the recorder 18. As the tape is rewinding, the number of tone segments 32 are counted at the cassette input port 24 of the computer 12. This establishes the position of the tape 28 at any given time. When the desired number of tones 32 have been counted, relay switch 48 is activated, stopping the rewinding.

To Fast Forward:

When it is desired to fast forward, relay switch 52 is activated thereby operating the fast forward of the recorder 18. The tone segments 32 are then counted at the cassette input port 24 of the computer 12 to establish the position of the tape at any desired moment. When the desired number of tones 32 have been counted, relay switch 66 is activated, stopping the tape recorder 18.

The preferred operation of the invention, as dictated by the computer program, is as follows. A student located at a remote location calls the telephone number where the machine is located. A telephone answering machine answers the telephone. The student then identifies himself by dialing in a series of code numbers or the like which must then be recognized by the computer. This is to prevent unauthorized use of the teaching service.

After initial instructions the machine asks the first question. The tape stops as a result of the computer detecting the end of a tone 19 from the control track 30. The voice synthesizer then instructs the student to speak. The audible response by the student is sensed by the computer and at the end of the response which is defined to be a pause of 0.5 seconds, the computer causes the tape player to play the next segment of the tape which contains the answer or correct response 42.

After the answer is played by the tape player the computer senses the end of the tone 32 associated with that answer and the voice synthesizer instructs the student to dial a 1 if his answer was correct or a 0 if his answer was incorrect. If the student's answer was correct, the computer causes the next question and answer sequence to be played. If, on the other hand, a 0 was dialed, the computer stores that fact, causes the next question and answer to be played and then returns to the question that ahd been answered incorrectly. It returns by rewinding the tape until the appropriate number of tone signals 32 are sensed. The erroneously answered question and the correct answer are then replayed. Subsequently, the computer causes the tape player to fast forward to the point from which it rewound to continue the instruction where it left off.

FIGS. 6–10 are a flowchart of the computer program which controls the operation of each of the components of the invention. In view of the foregoing description of the invention and operation thereof, it is believed that the flowchart should be self-explanatory. It is included herewith since it represents Applicant's presently preferred operation of the invention.

In order to make the flowchart more readable, certain portions thereof have been abbreviated. For example, in FIG. 6 the box labeled "Display File" etc. causes the computer to display on a CRT information concerning the person calling including the identification number. Also displayed would be the language being studied, the last lesson completed and the position in the lesson when the person hung up if the previous lesson was interrupted. The operator would also then be instructed to install the current lesson cassette in the tape recorder and to then press any key of the computer when the cassette has been installed.

Figure 7:
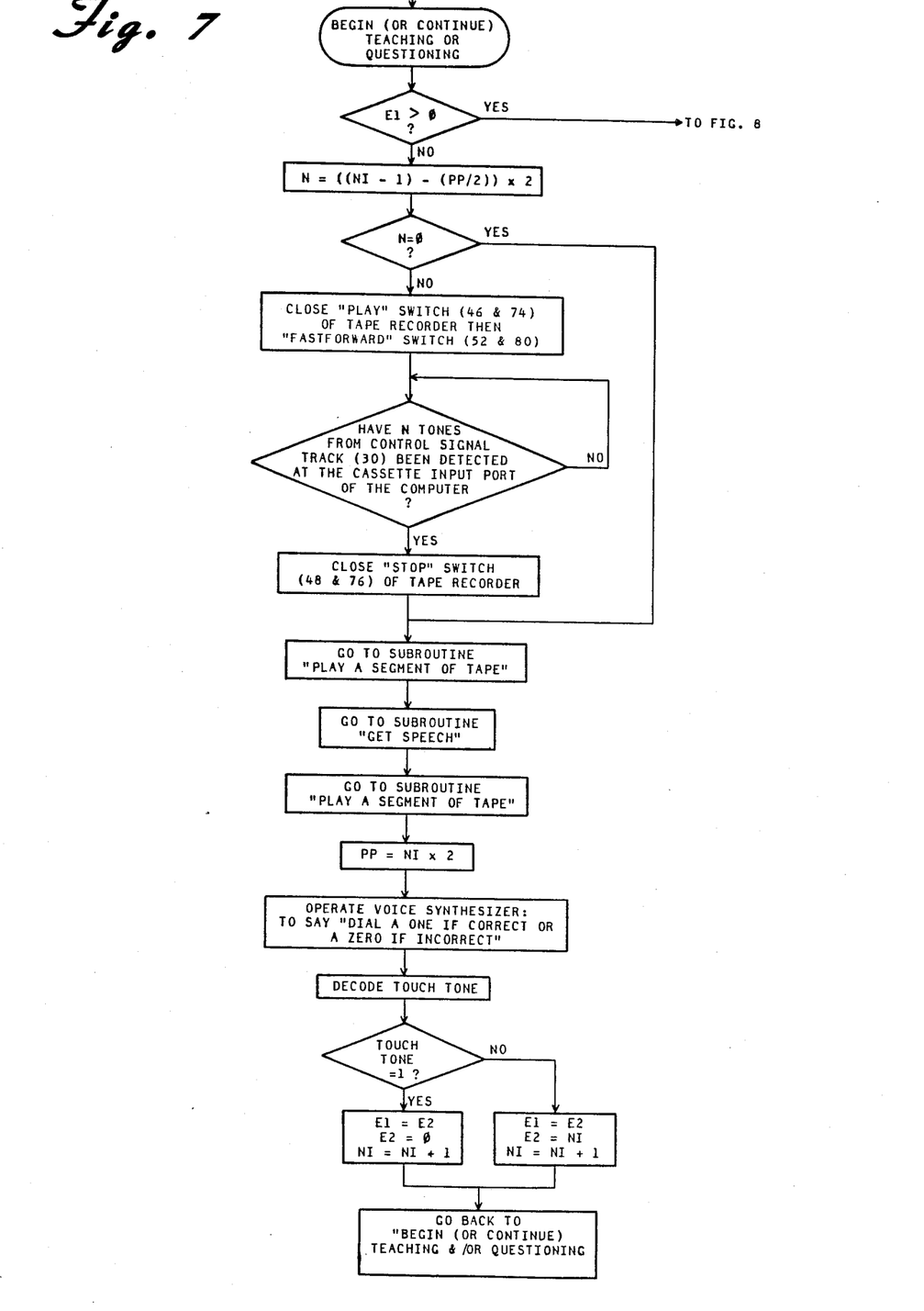
Figure 8:
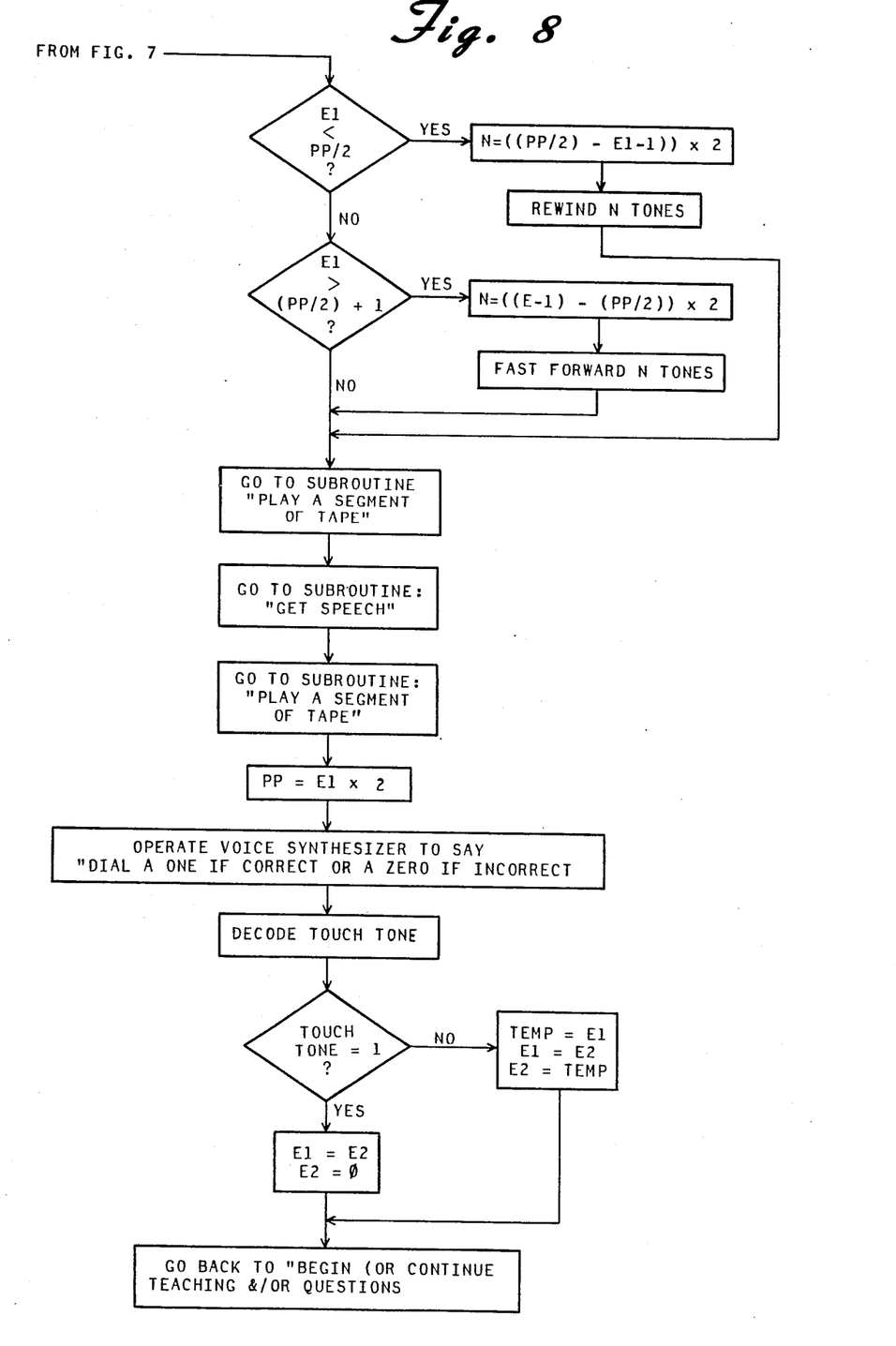
Figure 9:
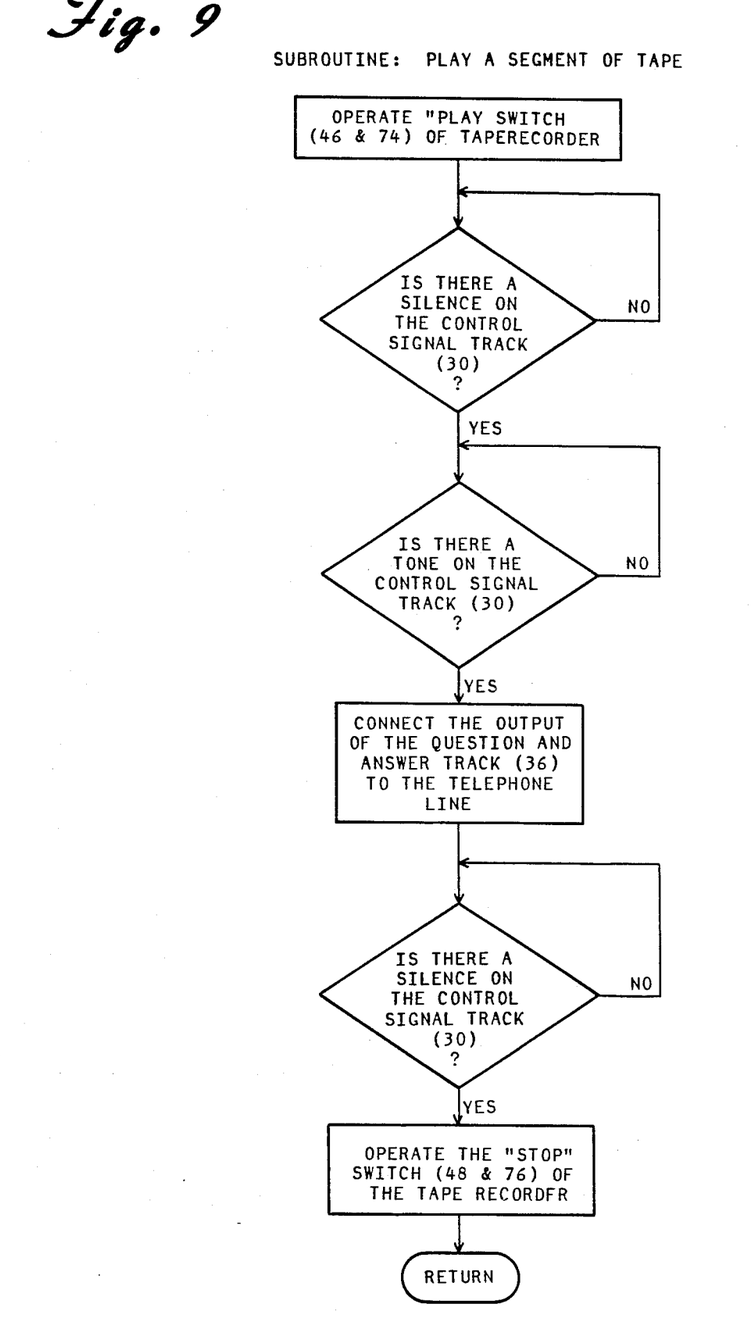
Figure 10:
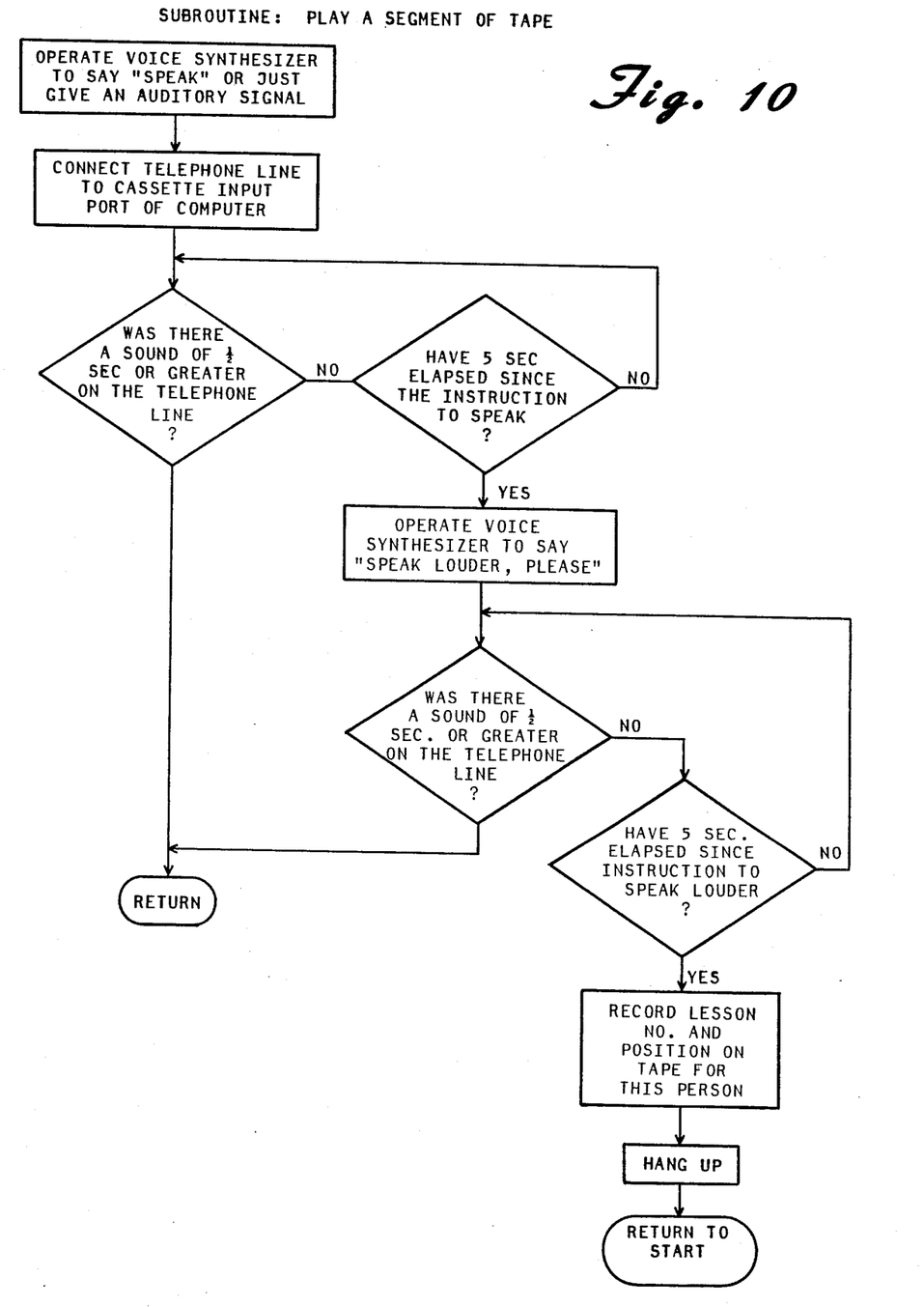

In FIG. 7 it should be noted that the term "$E1 > \phi$?" set forth in the first diamond-shaped box on the top asks whether there is an error at the top of the error stack. The equation directly beneath this, i.e. $N = ((NI-1) - (PP/2)) \times 2$, calculates the number of tones to fast forward if necessary. In this equation, PP is the present position of the tape in terms of the number of tones and NI is the next item, i.e. question and answer pair.

The present invention may be embodied in other specific forms without departing from the spirit or essential attributes thereof and accordingly reference should be made to the appended claims rather than to the foregoing specification as indicating the scope of the invention.

I claim:

1. A teaching machine comprising:
    a two-channel tape player;
    a magnetic tape arranged to be played by said tape player, said tape having a plurality of distinct tone signals prerecorded on a first track thereof, said tape also having a plurality of questions and a plurality of answers alternately prerecorded on a second track thereof;
    means connecting said tape player to a telephone line for playing the questions and answers from said second track onto said telephone line;
    means for automatically stopping said tape player after a question is played;
    means for sensing when an audible spoken response from a student is completed;
    means responsive to said audible response sensing means for starting said tape player to thereby play the answer to said question onto said telephone line;
    means for sensing a correct answer signal from the student and for then continuing subsequent questions and answers from said tape;
    means for sensing an incorrect answer signal from the student and for subsequently repeating the incorrectly answered question and its answer.

2. The teaching machine as claimed in claim 1 further including means responsive to said tone signals for controlling the operation of said tape player.

3. The teaching machine as claimed in claim 2 wherein the tone signals on said first track are arranged parallel to and in alignment with corresponding questions and answers on said second track.

4. The teaching machine as claimed in claim 1 wherein said means for subsequently repeating the incorrectly answered question first causes the next unanswered question and answer series to be played by the tape player.

5. The teaching machine as claimed in claim 1 wherein said means for sensing a correct answer signal and said means for sensing an incorrect answer signal is a touch tone decoder.

* * * * *